(12) United States Patent
Breternitz, Jr. et al.

(10) Patent No.: US 7,430,574 B2
(45) Date of Patent: Sep. 30, 2008

(54) EFFICIENT EXECUTION AND EMULATION OF BIT SCAN OPERATIONS

(75) Inventors: Mauricio Breternitz, Jr., Austin, TX (US); Youfeng Wu, Palo Alto, CA (US); Tal Abir, Beer Yaakov (IL)

(73) Assignee: Intel Corporation, Santa Clara, CA (US)

( * ) Notice: Subject to any disclaimer, the term of this patent is extended or adjusted under 35 U.S.C. 154(b) by 787 days.

(21) Appl. No.: 10/877,931

(22) Filed: Jun. 24, 2004

(65) Prior Publication Data

US 2005/0289203 A1   Dec. 29, 2005

(51) Int. Cl.
 *G06F 7/00*   (2006.01)
(52) U.S. Cl. ...................................... 708/211
(58) Field of Classification Search .......... 708/200–212
 See application file for complete search history.

(56) References Cited

U.S. PATENT DOCUMENTS

| | | | | | |
|---|---|---|---|---|---|
| 4,539,549 | A | * | 9/1985 | Hong et al. ................. | 708/207 |
| 4,592,005 | A | * | 5/1986 | Kregness ..................... | 708/490 |
| 4,924,421 | A | * | 5/1990 | Seguchi ....................... | 708/211 |
| 4,947,358 | A | * | 8/1990 | Lamere et al. ............... | 708/205 |
| 5,416,783 | A | * | 5/1995 | Broseghini et al. .......... | 708/250 |
| 5,526,296 | A | * | 6/1996 | Nakahara et al. ............ | 708/209 |
| 5,651,121 | A | * | 7/1997 | Davies ........................ | 708/490 |
| 5,675,617 | A | * | 10/1997 | Quirk et al. ................. | 708/210 |
| 6,105,032 | A | | 8/2000 | Bunda et al. | |
| 6,173,300 | B1 | * | 1/2001 | Mahurin ...................... | 708/211 |

OTHER PUBLICATIONS

Intel Corporation, "IA-32 Intel Architecture Software Developer's Manual", pp. 3-52 to 3-55, vol. 2A: Instruction Set Reference, A-M, 1997-2004.
Intel Corporation, "Intel Itanium Architecture Software Developer's Manual", pp. 3:43-44, 3:179-180, 3:164-166, 3:48, 3:186 and 3:743-45, vol. 3: Instruction Set Reference, Revision 2.1, Oct. 2002.
Baranz, L, et al., "IA-32 Execution Layer" a two-phase dynamic translator designed to support IA-32 applications on Itanium-based systems, 11 pages, IEEE, Computer Society, Proceedings of the 36th International Symposium on Microarchitecture (MICROS-36'03).

* cited by examiner

*Primary Examiner*—Chat C Do
(74) *Attorney, Agent, or Firm*—Blakely, Sokoloff, Taylor & Zafman LLP

(57) ABSTRACT

Methods are disclosed to implement bit scan operations using properties of two's complement arithmetic and compute zero index instructions. A data value may be provided and the most-significant or least-significant bit may be determined using the methods set forth herein.

5 Claims, 10 Drawing Sheets

| Bit Scan Forward | Bit Scan Reverse |
|---|---|
| X = 01001001 | X = 01001001 |
| BSF(X) = 0 | BSR(X) = 6 |
| 102 | 104 |

EFFICIENT EXECUTION AND EMULATION OF BIT SCAN OPERATIONS

BACKGROUND

The present invention relates to the field of microprocessor instructions, and more particularly to bit scan operation instructions and binary translations.

Bit scan operations search for the least-significant bit or most-significant bit set in a data set. The Intel® IA-32 architecture provides hardware assist for such operations via the BSF (bit scan forward) and BSR (bit scan reverse) instructions. On the IA-32 architecture these instructions operate on 8-bit, 16-bit or 32-bit values. Software may combine these instructions to operate on larger data sets.

FIG. 1 illustrates an example of the BSF and BSR instructions operating on an 8-bit binary value X. Box 102 shows the BSF instruction operating on an 8-bit value X. Since the bit in position 0 corresponds to the least significant bit of X set to a value of '1,' BSF(X)=0. Similarly, box 104 illustrates the BSR instruction operating on an 8-bit value X. Since the bit in position 6 corresponds to the most significant bit of X set to a value of '1,' BSR(X)=6.

Microarchitecture implementations may support bit scan operations either by a sequence of microcode operations, or by providing special ALU (arithmetic logic unit) operations. The use of microcode may be expensive and impact performance, while the use of special ALU operations may be costly in terms of chip area. Binary translators and emulators for architectures that have bit scan operations, such as the IA-32 Execution Layer (IA32EL), support those operations via code sequences provided by the underlying instruction set.

One possible microcode implementation of a bit scan operation may use a microcode loop. The microcode loop implementation may lead to variable execution times, which is not a good match for instruction schedulers.

Another possible implementation is a look up table, in which the data value being scanned is used to index a table. This implementation is only economical for small data tables. Some approaches combine the data table with the microcode loop described above, thus "breaking" the input data into smaller chunks. This implementation is used in the IA32EL binary translator from Intel® x86 to Intel® Itanium™ microprocessor instructions. This implementation results in a less efficient code sequence consisting of 22 Itanium™ microprocessor instructions. Furthermore, if bit-scan operations are infrequent, the table look up approach may incur cache penalties from cache misses which may further hinder performance.

Another approach recursively breaks the data set in halves to perform the operation in a number of iterations proportional to the logarithm of the data set.

BRIEF DESCRIPTION OF THE DRAWINGS

FIG. 1 is an illustration of an example bit scan forward and bit scan reverse operation.

DETAILED DESCRIPTION OF THE PRESENT INVENTION

Embodiments of a method for efficient execution and emulation of bit-scan operations are disclosed. In the following description, numerous specific details are set forth. However, it is understood that embodiments may be practiced without these specific details. In other instances, well-known circuits, structures and techniques have not been shown in detail in order not to obscure the understanding of this description.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As described above, and as illustrated in FIG. 1, bit scan operations may be used to search for the least-significant bit (bit scan forward) or most-significant bit (bit scan reverse) in a data value. Embodiments of the present invention may be used to execute and/or emulate bit scan forward or bit scan reverse operations on data values in architectures which do not provide instructions for those operations. In one embodiment, the data value operated on may be a 64-bit number. In other embodiments, the data value may be any $2^n$ bit number, where n may be any integer value. For the purpose of the present disclosure, all bit positions and byte positions are numbered from 0 to N−1, where N is equal to the number of bits (or bytes) in the data value. However, the methods disclosed herein may also be applied where the bit and/or byte positions are numbered from 1 to N. Hexadecimal numbers are identified in the format: h0x00000000. Binary numbers are identified in the format b00000000. All other numbers are given in their decimal representations.

Figure 2:
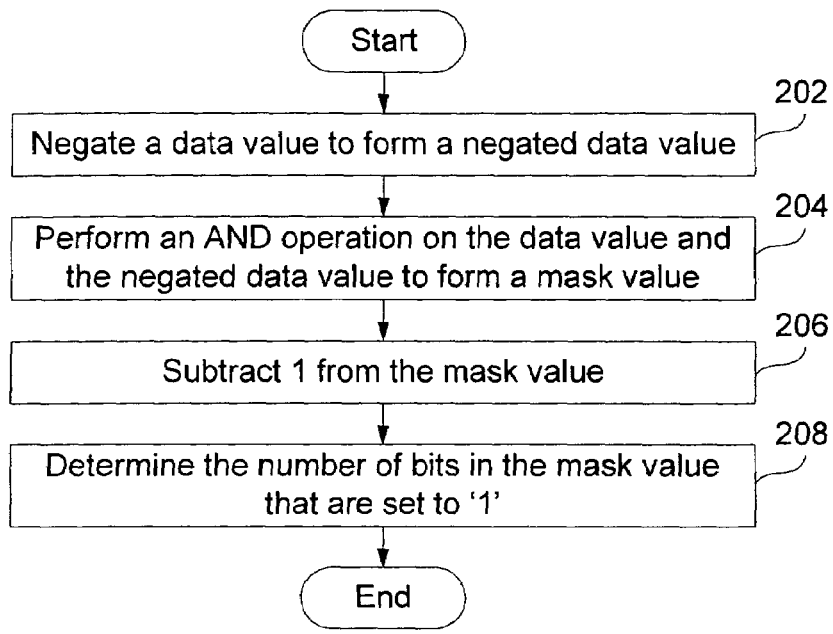
FIG. 2 is a flowchart illustrating an implementation of a bit scan forward operation using two's complement arithmetic.

FIG. 2 is a flowchart illustrating an embodiment wherein two's complement arithmetic may be used to detect the least significant bit in a data value, thus emulating a bit scan forward instruction. First, as shown in block 202, a data value is negated to form a negated data value. In one embodiment, two's complement arithmetic may be used to negate the data value. In two's complement arithmetic, to negate a value, the value is inverted (complemented) and one is added to the inverted value. Next, as shown in block 204, an AND operation is performed on the data value and the negated data value to form a mask value. Thus, in the mask value only the least significant bit of the value will be set to one, and all other bits will be zero. Next, in block 206, 1 is subtracted from the mask value. This creates a mask value that has all "1" bits up to the least significant bit. Finally, in block 208, the quantity of bits in the mask value that are set to "1" is determined. The quantity of bits set to "1" may be determined by performing a population count operation on the mask value. The quantity of bits in the mask value that are set to one is equal to the bit position of the least significant bit in the original data value.

Figure 3:
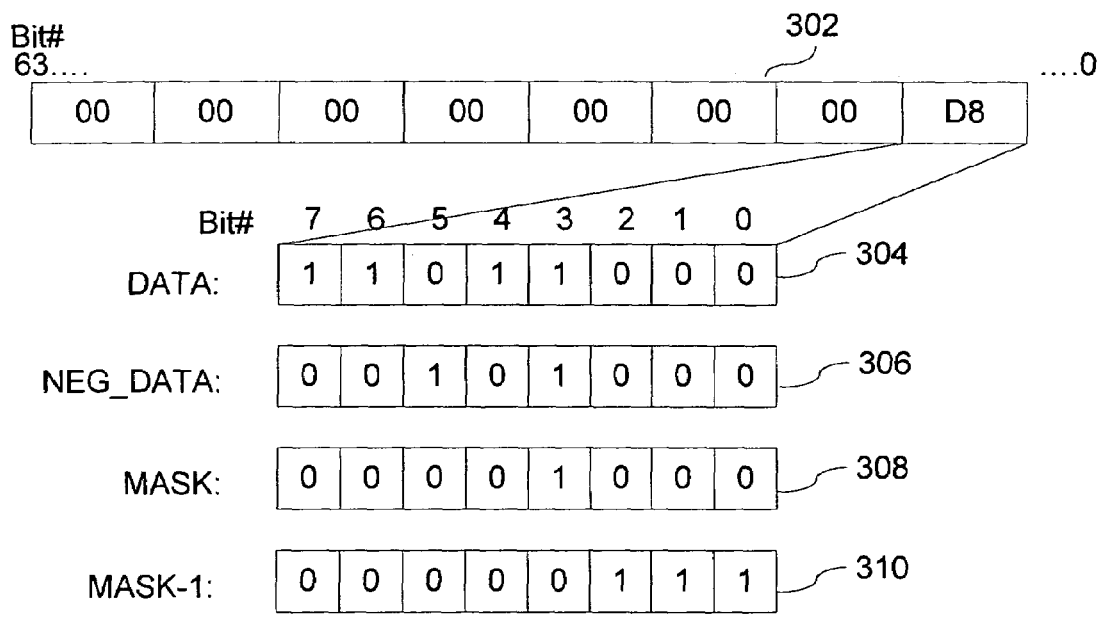
FIG. 3 is an illustration of an example implementation of a bit scan forward operation using two's complement arithmetic.

FIG. 3 illustrates an example of a bit scan forward operation using the method illustrated in the flowchart of FIG. 2. A 64-bit data value 302 is provided. For ease of explanation, only the lowest byte 304 of the data value is illustrated; however, all operations may be performed on all bits in the data value. The bits of the data value 304 (DATA) are negated to form a negated data value 306 (NEG_DATA). An AND operation is then performed on DATA and NEG_DATA. The result of the AND operation is MASK value 308. Finally, one is subtracted from MASK value 308 resulting in MASK-1 value 310. The quantity of bits set to "1" in MASK-1 value 310 is equivalent to the bit position of the least significant bit in 64-bit data value 302. There are three bits set to "1" in MASK-1 value 310. As illustrated by binary DATA value 304, the least significant bit of data value 302 is bit number 3.

Figure 4:
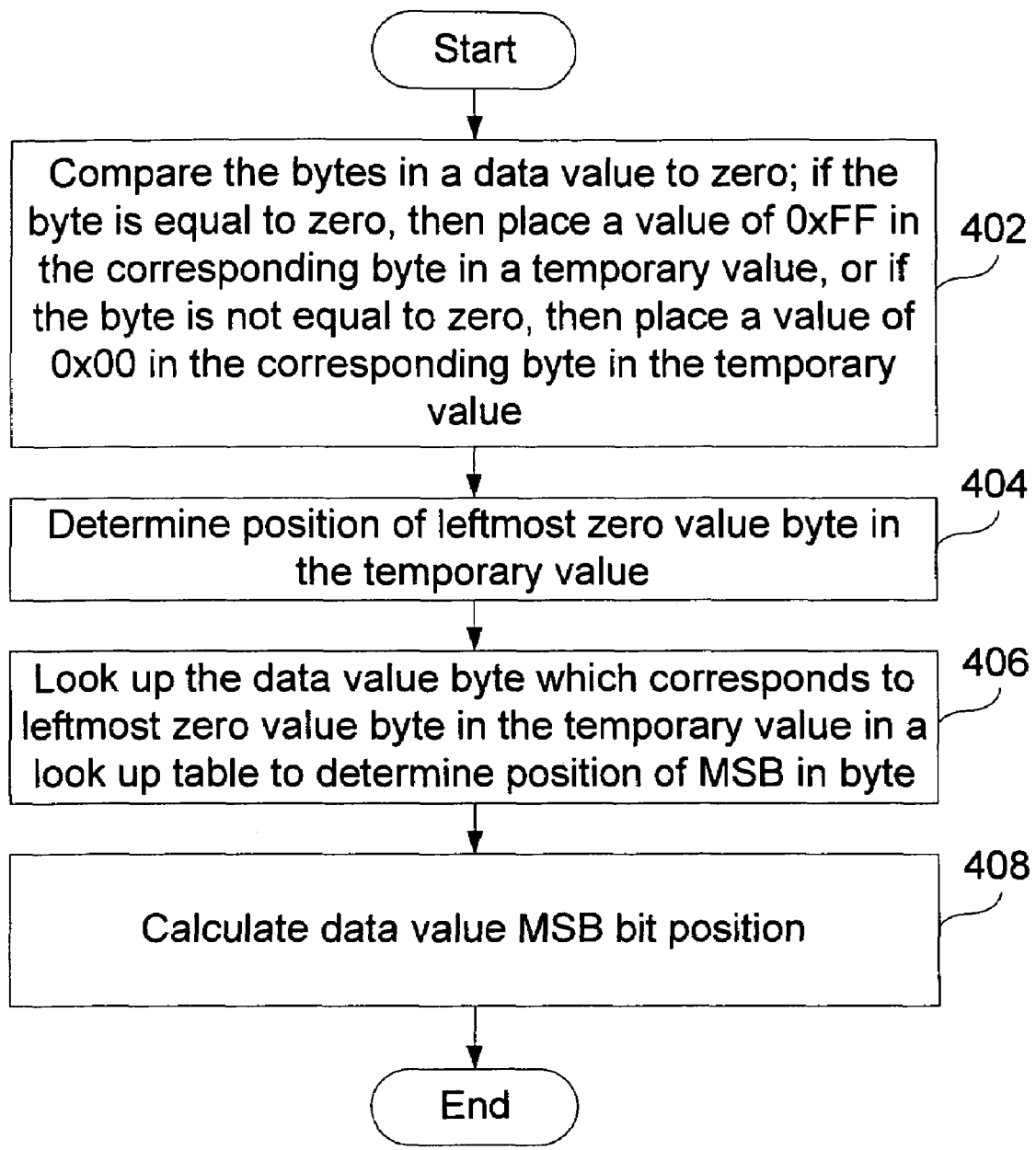
FIG. 4 is a flowchart illustrating an implementation of a bit scan reverse operation using one table lookup.

FIG. 4 is a flowchart illustrating an embodiment wherein the most significant bit of a data value may be detected using only one table lookup, thus emulating a bit scan reverse instruction. First, as shown in block 402, each byte in a data value is compared to zero. If the byte is equal to zero, then a value of h0xFF is placed in the corresponding byte in a temporary value. If the byte is not equal to zero, than a value of h0x00 is placed in the corresponding byte in a temporary value. Thus, each byte containing at least a value of 1 will be set to 0. In one embodiment, the compare operation may be done using a parallel compare instruction. Next, in block 404, the position of the leftmost zero value byte in the temporary value is determined. In one embodiment, the position of the leftmost zero value byte may be determined using an instruction which scans the argument and returns the position of the leftmost byte containing all zeros. In the Intel® Itanium™ architecture, this may be done using the compute zero index (czx) instruction. The compute zero index instruction scans the argument and returns the position of the leftmost byte containing all zeros. The position of the leftmost zero byte is the position of the leftmost byte in the original data value which contains at least a 1. Next, in block 406, the position of the most significant bit in the data value byte which corresponds to the leftmost zero value byte in the temporary value is determined by using a look-up table. In one embodiment, the look-up table may have 256 entries. In other embodiments, the look-up table may contain $2^n$ entries, where n may be any integer value. Finally, in block 408, the most significant bit in the data value is calculated. The most significant bit may be calculated by multiplying the number of bits in a byte (8) by the position of the leftmost zero byte in the temporary value, and then adding the value returned from the look-up table.

Figure 5:
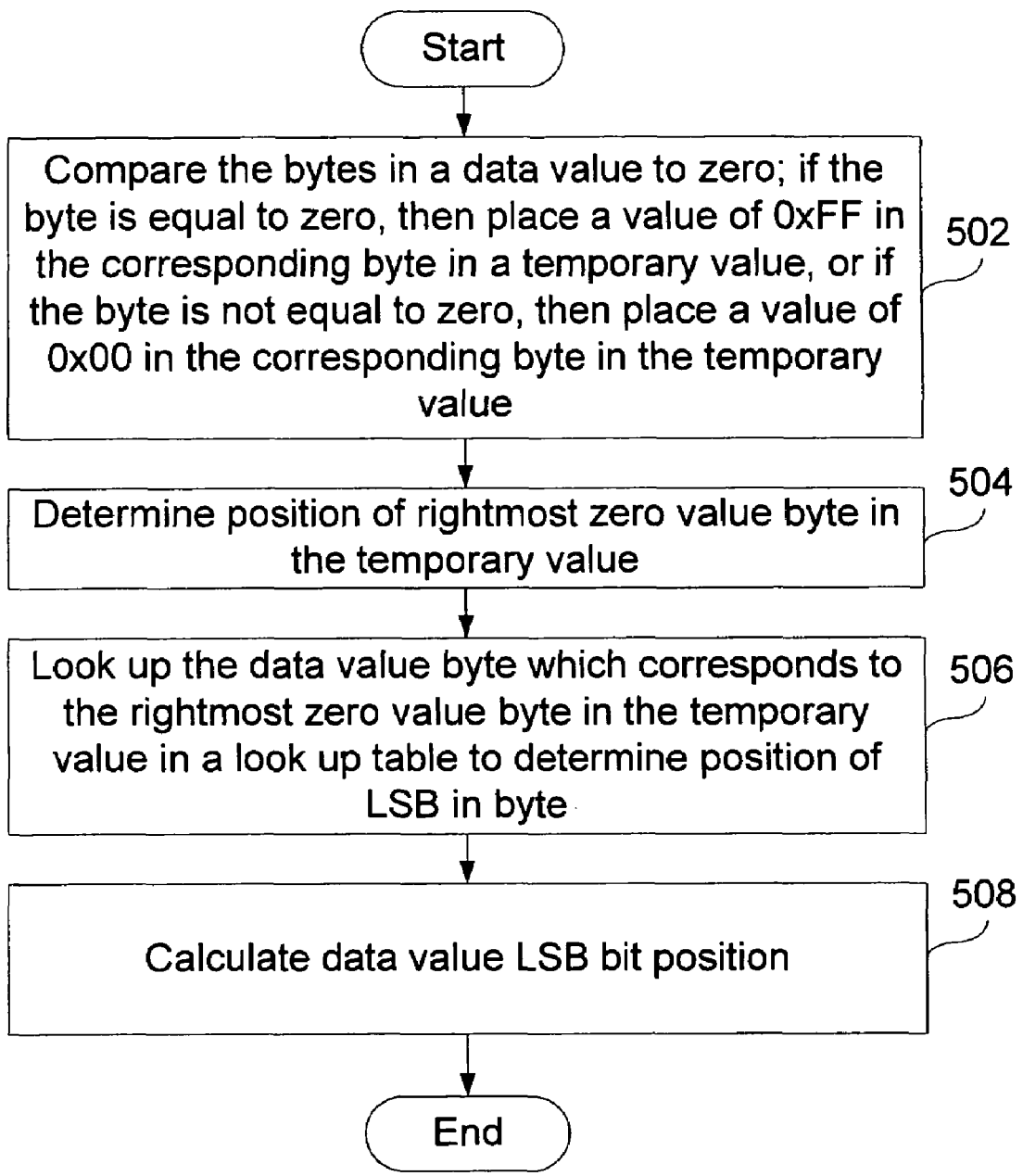
FIG. 5 is a flowchart illustrating an implementation of a bit scan forward operation using one table lookup.

In another embodiment, a similar method may be used to determine the position of the least significant bit of a data value using only one table lookup. This embodiment is illustrated by the flowchart of FIG. 5. Each byte in a data value is compared to zero. If the byte is equal to zero, then a value of h0xFF is placed in the corresponding byte in a temporary value. If the byte is not equal to zero, than a value of h0x00 is placed in the corresponding byte in a temporary value. Thus, each byte containing at least a value of 1 will be set to 0. In one embodiment, the compare operation may be done using a parallel compare instruction. In block 504, the position of the rightmost zero value byte in the temporary value is determined. In one embodiment, the position of the rightmost zero value byte may be determined using an instruction which scans the argument and returns the position of the rightmost byte containing all zeros. In the Intel® Itanium™ architecture, this may be done using the compute zero index (czx) instruction. The position of the rightmost zero byte is the position of the rightmost byte in the original data value which contains at least a 1. Next, in block 506, the position of the least significant bit in the data value byte which corresponds to the rightmost zero value byte in the temporary value is determined by using a look-up table. In one embodiment, the look-up table may have 256 entries. In other embodiments, the look-up table may contain $2^n$ entries, where n may be any integer value. Finally, in block 508, the least significant bit in the data value is calculated. The least significant bit position may be calculated by multiplying the number of bits in a byte (8) by the position of the rightmost zero byte in the temporary value, and then adding the value returned from the look-up table.

Figure 6:
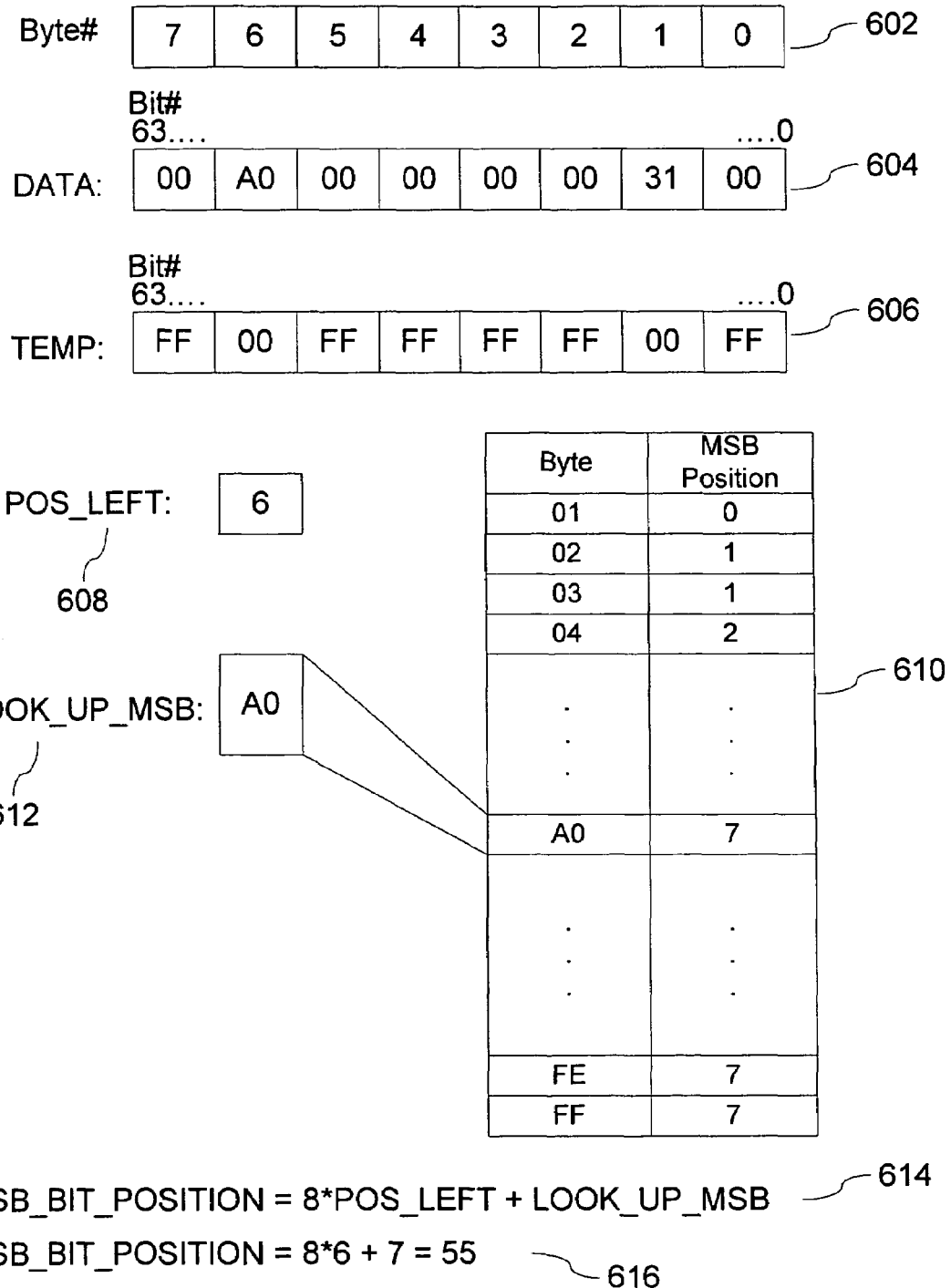
FIG. 6 is an illustration of an example implementation of a bit scan reverse operation using one table lookup.

FIG. 6 illustrates an example of a bit scan reverse operation using the method illustrated in the flowchart of FIG. 4. A 64-bit data value 604 (DATA) is provided. The byte position of each byte in the DATA value 604 is indicated by byte number 602. Each byte in DATA value 604 is compared to zero. If a byte in DATA value 604 is equal to h0x00, a value of h0xFF is placed in the corresponding byte of temporary value 606 (TEMP). If a byte in DATA value 604 is not equal to h0x00, a value of h0x00 is placed in the corresponding byte of TEMP value 606. Thus, because byte number 7 of DATA value 604 is equal to h0x00, a value of h0xFF is placed in byte number 7 of TEMP value 606. Similarly, because byte number 6 of DATA value 604 is not equal to h0x00, a value of h0x00 is placed in byte number 6 of TEMP value 606, and so on. Next, the position of the leftmost zero value byte of TEMP value 606 is determined. The leftmost zero value byte of TEMP value 606 is in byte number 6, 608 (POS_LEFT). Next, byte 6 of DATA value 604, is referenced in a look-up table 610 to determine the position of the most significant bit of the byte. The result returned, LOOK_UP_MSB, 612, is the most significant bit position, bit 7. Finally, to calculate the position of the most significant bit, MSB_BIT_POSITION, multiply 8 (the number of bits in a byte) times POS_LEFT, and add the result returned from the look-up table, LOOK_UP_MSB, as shown by formula 614. The most significant bit of DATA value 504 is in bit position number 55, 616.

An example calculation using this method to find the bit position of the least significant bit would be very similar to that set forth above and illustrated in FIG. 6. Rather than determining the leftmost byte in the temporary value containing all zeros, 608, the rightmost byte would be determined. The look-up table, 610, would contain least significant bit positions rather than most significant bit positions. Finally, the formula used to calculate the position of the least significant bit would be 8 times the position of the rightmost byte of the temporary value which contains all zeros plus the least significant bit position returned from the look-up table.

Figure 7:
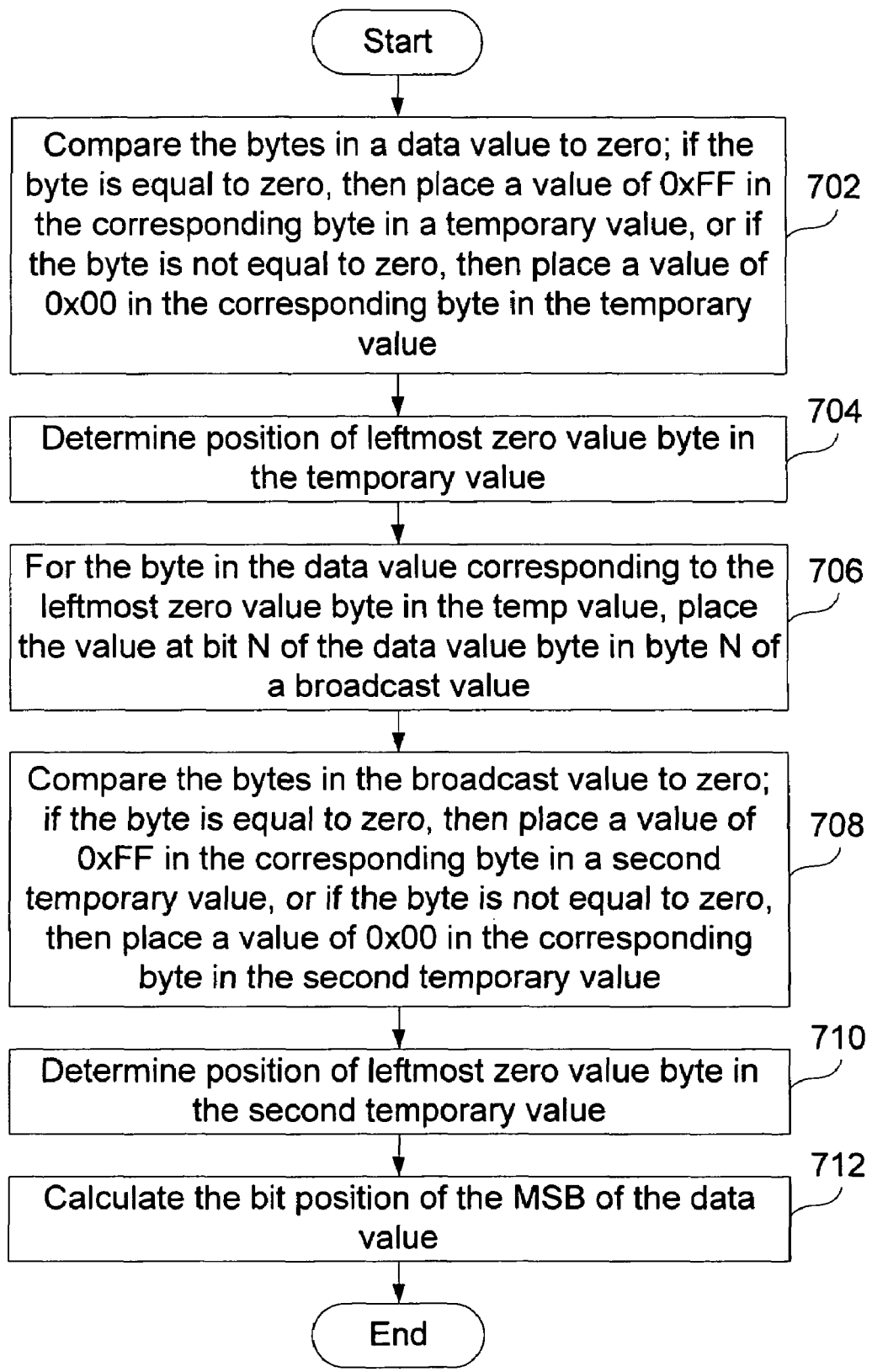
FIG. 7 is a flowchart illustrating an implementation of a bit scan reverse operation without a table lookup.

FIG. 7 is a flowchart illustrating an embodiment wherein the position of the most significant bit of a data value may be detected without a table lookup, thus emulating a bit scan reverse instruction. First, as shown in block 702, each byte in a data value is compared to zero. If the byte is equal to zero, then a value of h0xFF is placed in the corresponding byte in a first temporary value. If the byte is not equal to zero, than a value of h0x00 is placed in the corresponding byte in a first temporary value. Thus, each byte of the data value containing at least a value of 1 will be set to 0 in the first temporary value. In one embodiment, the compare operation may be done using a parallel compare instruction. Next, in block 704, the position of the leftmost zero value byte in the first temporary value is determined. In one embodiment, the position of the leftmost zero value byte may be determined using an instruction which scans the argument and returns the position of the leftmost byte containing all zeros. In the Intel® Itanium™ architecture, this may be done using the compute zero index (czx) instruction. The position of the leftmost zero byte is the position of the leftmost byte in the original data value which contains at least a 1. Next, in block 606, for the byte in the data value corresponding to the leftmost zero value byte, the value at bit N of the data value byte is placed in byte N of a broadcast value. In the Intel® Itanium™ architecture, this may be done using a multiplex (mux) instruction, which broadcasts the 8 bits of the least significant byte to the 8 bytes in the result register. Next, in block 708, each byte in the broadcast value is compared to zero. If the byte is equal to zero, then a value of h0xFF is placed in the corresponding byte in a second temporary value. If the byte is not equal to zero, than a value of h0x00 is placed in the corresponding byte in the second temporary value. Thus, each byte containing at least a value of 1 in the broadcast value will be set to 0 in the second temporary value. In one embodiment, this compare operation may be performed using a parallel compare instruction. Next, in block 710, the position of the leftmost zero value byte in the second temporary value is determined. The position of the leftmost zero value byte in the second temporary value corresponds to the bit position of the most significant bit in the data value byte which contains the most significant bit. In one embodiment, the position of the leftmost zero value byte may be determined using an instruction which scans the argument and returns the position of the leftmost byte containing all zeros. In the Intel® Itanium™ architecture, this may be done using the compute zero index (czx) instruction. Finally, in block 712, the most significant bit of the data value is calculated. In one embodiment, the most significant bit may be calculated by multiplying the number of bits in a byte (8) times the position of the leftmost zero value byte in the first temporary value, and then adding the position of the leftmost zero value byte in the second temporary value.

Figure 8:
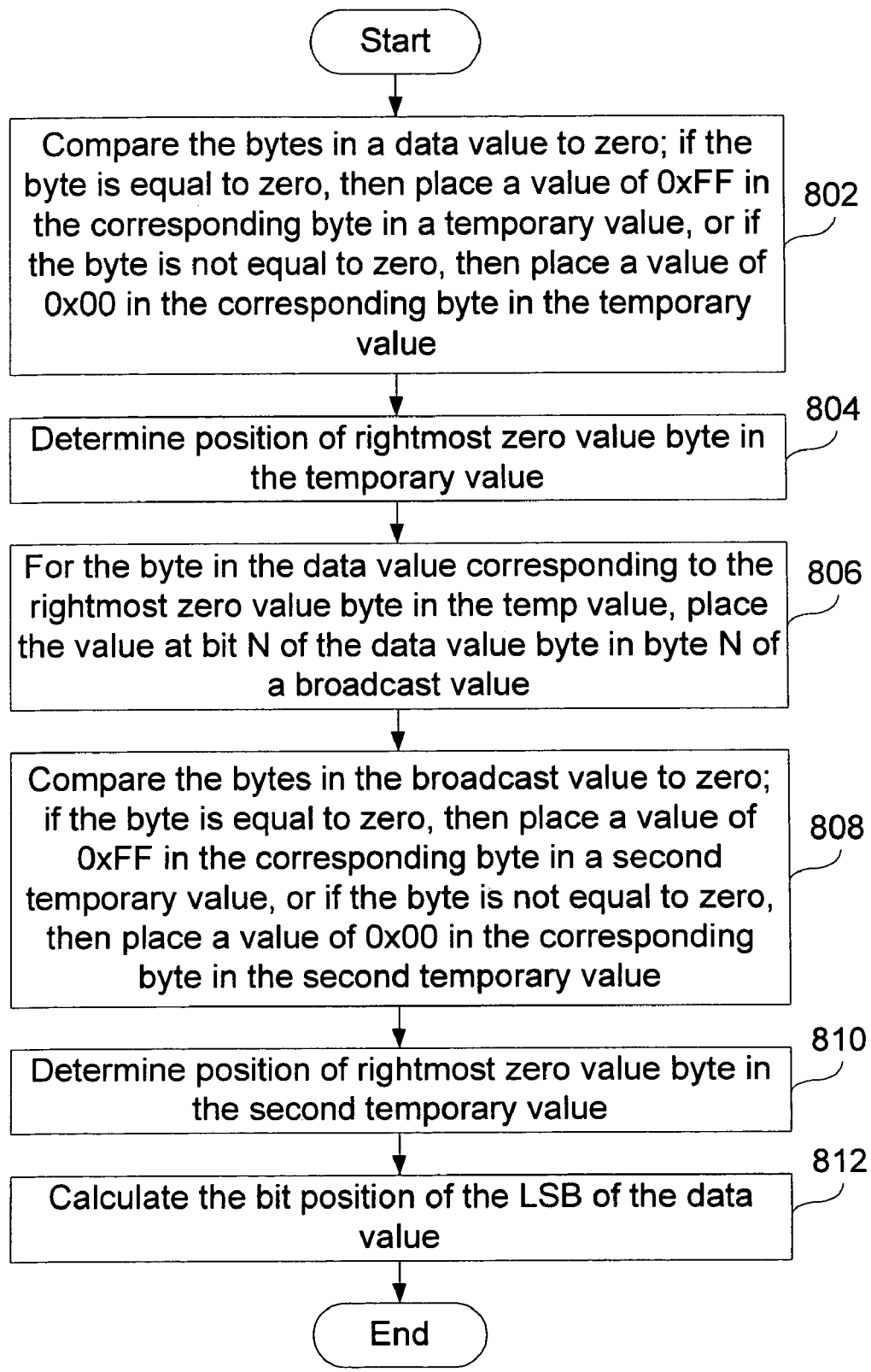
FIG. 8 is a flowchart illustrating an implementation of a bit scan forward operation without a table lookup.

In another embodiment, this method may be used to determine the position of the least significant bit of a data value without using a table lookup. This embodiment is illustrated by the flowchart of FIG. 8. Block 802 illustrates a compare operation similar to that of block 702 of FIG. 7. Each byte in a data value is compared to zero. If the byte is equal to zero, then a value of h0xFF is placed in the corresponding byte in a first temporary value. If the byte is not equal to zero, than a value of h0x00 is placed in the corresponding byte in a first temporary value. Thus, each byte of the data value containing at least a value of 1 will be set to 0 in the first temporary value. In one embodiment, the compare operation may be done using a parallel compare instruction. Next, in block 804, the position of the rightmost zero value byte in the first temporary value is determined. In one embodiment, the position of the rightmost zero value byte may be determined using an instruction which scans the argument and returns the position of the rightmost byte containing all zeros. In the Intel® Itanium™ architecture, this may be done using the compute zero index (czx) instruction. The position of the rightmost zero byte is the position of the rightmost byte in the original data value which contains at least a 1. Next, in block 806, for the byte in the data value corresponding to the rightmost zero value byte, the value at bit N of the data value byte is placed in byte N of a broadcast value. Next, in block 808, each byte in the broadcast value is compared to zero. If the byte is equal to zero, then a value of h0xFF is placed in the corresponding byte in a second temporary value. If the byte is not equal to zero, than a value of h0x00 is placed in the corresponding byte in the second temporary value. Thus, each byte containing at least a value of 1 in the broadcast value will be set to 0 in the second temporary value. In one embodiment, this compare operation may be performed using a parallel compare instruction. Next, in block 810, the position of the rightmost zero value byte in the second temporary value is determined. The position of the rightmost zero value byte in the second temporary value corresponds to the bit position of the least significant bit in the data value byte which contains the least significant bit. In one embodiment, the position of the rightmost zero value byte may be determined using an instruction which scans the argument and returns the position of the rightmost byte containing all zeros. In the Intel® Itanium™ architecture, this may be done using the compute zero index (czx) instruction. Finally, in block 812, the most significant bit of the data value is calculated. In one embodiment, the most significant bit may be calculated by multiplying the number of bits in a byte (8) times the position of the rightmost zero value byte in the first temporary value, and then adding the position of the rightmost zero value byte in the second temporary value.

Figure 9:
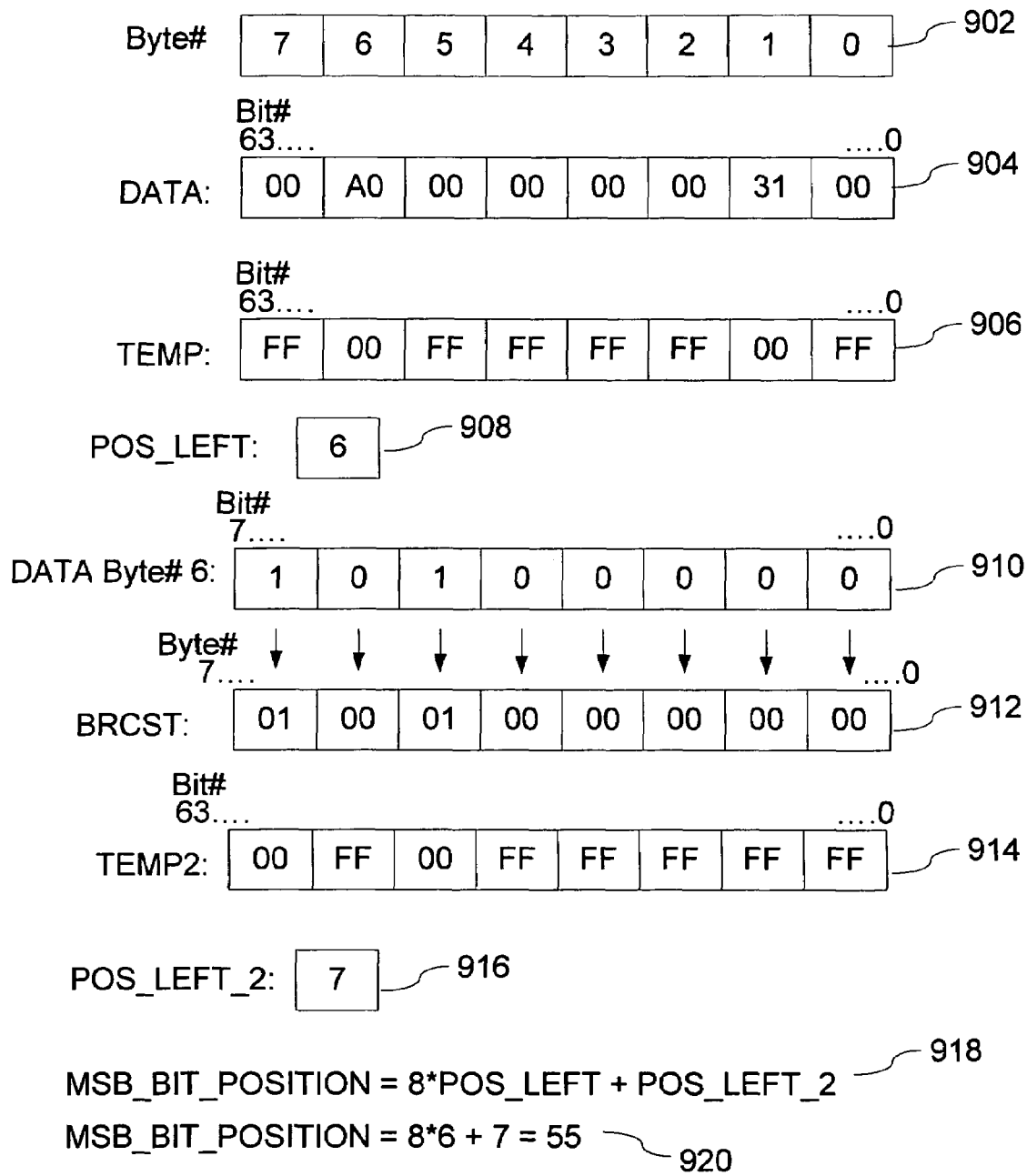
FIG. 9 is an illustration of an example implementation of a bit scan reverse operation without a table lookup.

FIG. 9 is an illustration of an example implementation of a bit scan reverse operation without a table lookup using the method illustrated in the flowchart of FIG. 7. A 64-bit data value 904 (DATA) is provided. The byte position of each byte in the DATA value 904 is indicated by byte number 902. Each byte in DATA value 904 is compared to zero. If a byte in DATA value 904 is equal to h0x00, a value of h0xFF is placed in the corresponding byte of a first temporary value 706 (TEMP). If a byte in DATA value 904 is not equal to h0x00, a value of h0x00 is placed in the corresponding byte of TEMP value 906. Thus, because byte number 7 of DATA value 904 is equal to h0x00, a value of h0xFF is placed in byte number 7 of TEMP value 906. Similarly, because byte number 6 of DATA value 904 is not equal to h0x00, a value of h0x00 is placed in byte number 6 of TEMP value 906, and so on. Next, the position of the leftmost zero value byte of TEMP value 906 is determined. The leftmost zero value byte of TEMP value 906 is in byte number 6, 908 (POS_LEFT). Next, each bit of DATA byte number 6 is broadcast to a broadcast value. This operation places the value of each bit in the leftmost DATA value byte containing at least a one in the corresponding byte of BRCST value 912. Next, another compare operation is performed. For each byte in BRCST value 912 that is equal to zero, the corresponding byte in a second temporary value 914 (TEMP2) is set to h0xFF. For each byte in BRCST value 912 that is not equal to zero, the corresponding byte in TEMP2 is set to h0x00. Next, the leftmost zero value byte of TEMP2 is determined. The leftmost zero value byte of TEMP2, 916, is in byte position 7. Finally, the position of the most significant bit is calculated using formula 918. The most significant bit, 920, of DATA value 904 is in bit position number 55.

An example calculation using this method to find the bit position of the least significant bit would be very similar to that set forth above and illustrated in FIG. 9. Rather than determining the leftmost byte in the temporary value containing all zeros, 608, the rightmost byte would be determined and would be broadcast to the broadcast value. The rightmost zero value byte of the broadcast value would then be determined. Finally, the formula used to calculate the position of the least significant bit would be 8 times the position of the rightmost byte of the temporary value which contains all zeros plus position of the rightmost zero value byte of the broadcast value.

Figure 10:
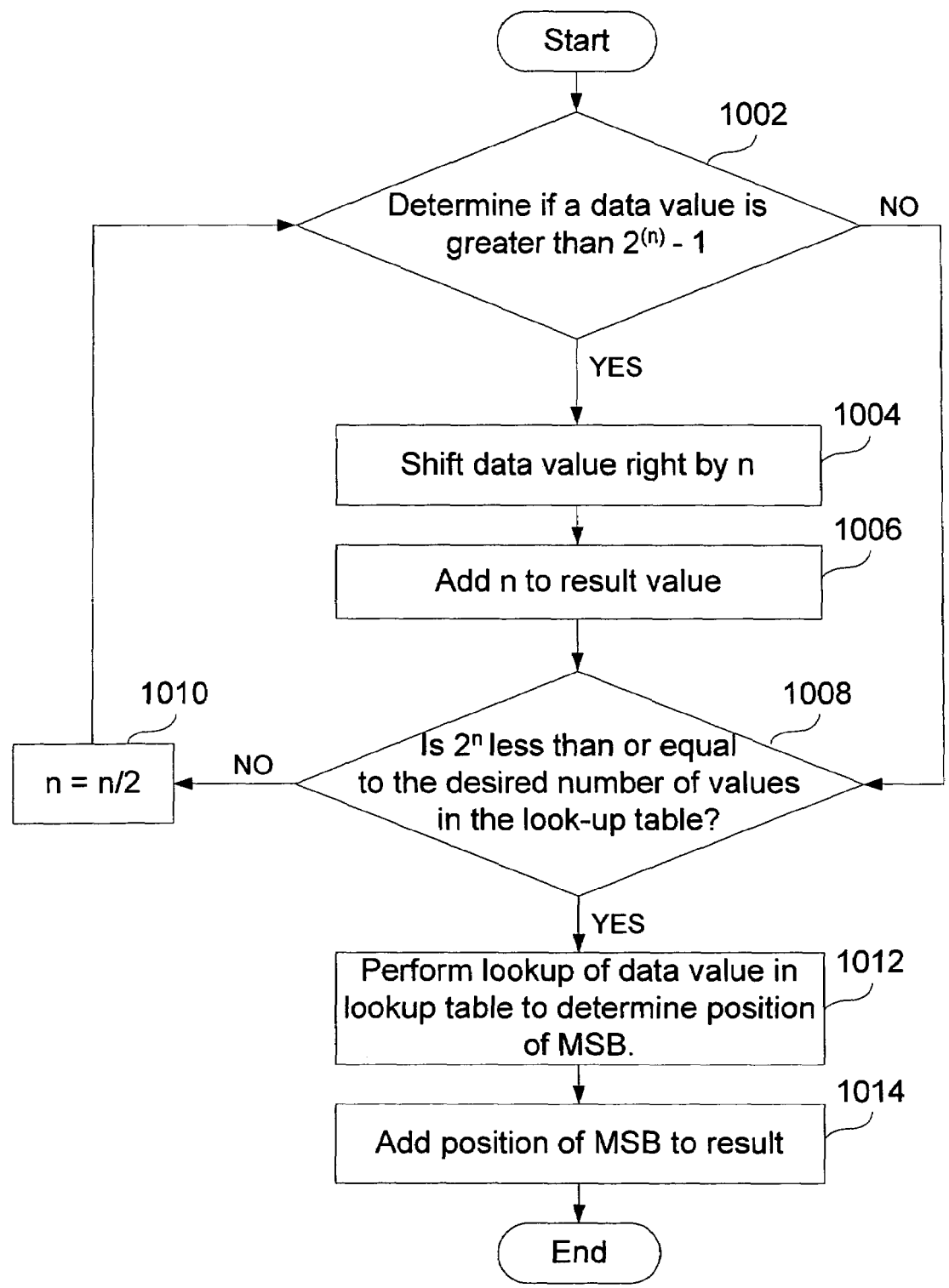
FIG. 10 is a flowchart illustrating an integer instruction sequence implementation of a bit scan reverse operation.

FIG. 10 is a flowchart illustrating an integer instruction sequence implementation of a bit scan reverse operation. This implementation may be more efficient in instances where the multimedia instructions have a latency of x3 or more when combined with integer instructions. The efficiency of this implementation depends on the ability of the CPU to execute two integer instructions in parallel. First, as illustrated in block 1002, a comparison is done to determine whether a data value is greater than $2^n-1$. The initial value of n is equal to the number of bits in the data value divided by two. In one embodiment, the data value is a 64-bit value and the value of n is 32. The comparison may be implemented using an integer compare instruction. If the data value is not greater than $2^n-1$ (1002), the value of n is halved as shown by block 1010, and another comparison must be done as shown in block 1002. If the data value is greater than $2^n-1$, then the data value is shifted right by n, as illustrated in block 1004, and a result value is incremented by the value of n, as illustrated in block 1006. In one embodiment, the increment and shift operations (1004, 1006) may be executed in parallel. Next in block 1008, if $2^n$ is greater than the desired values in a look-up table (1008), then the value of n is halved as shown in block 1010, and another comparison must be done as shown in block 1002. If $2^n$ is less than or equal to the desired number of values in a look-up table, a look-up is performed in a look-up table to determine the position of the most significant bit (1012). In one embodiment, the desired number of values in the look-up table may be $2^8$ or 256. Finally, in block 1014, the position of the most significant bit is added to the result value. The bit position of the most significant bit will be equal to the result value of block 1014.

Figure 11:
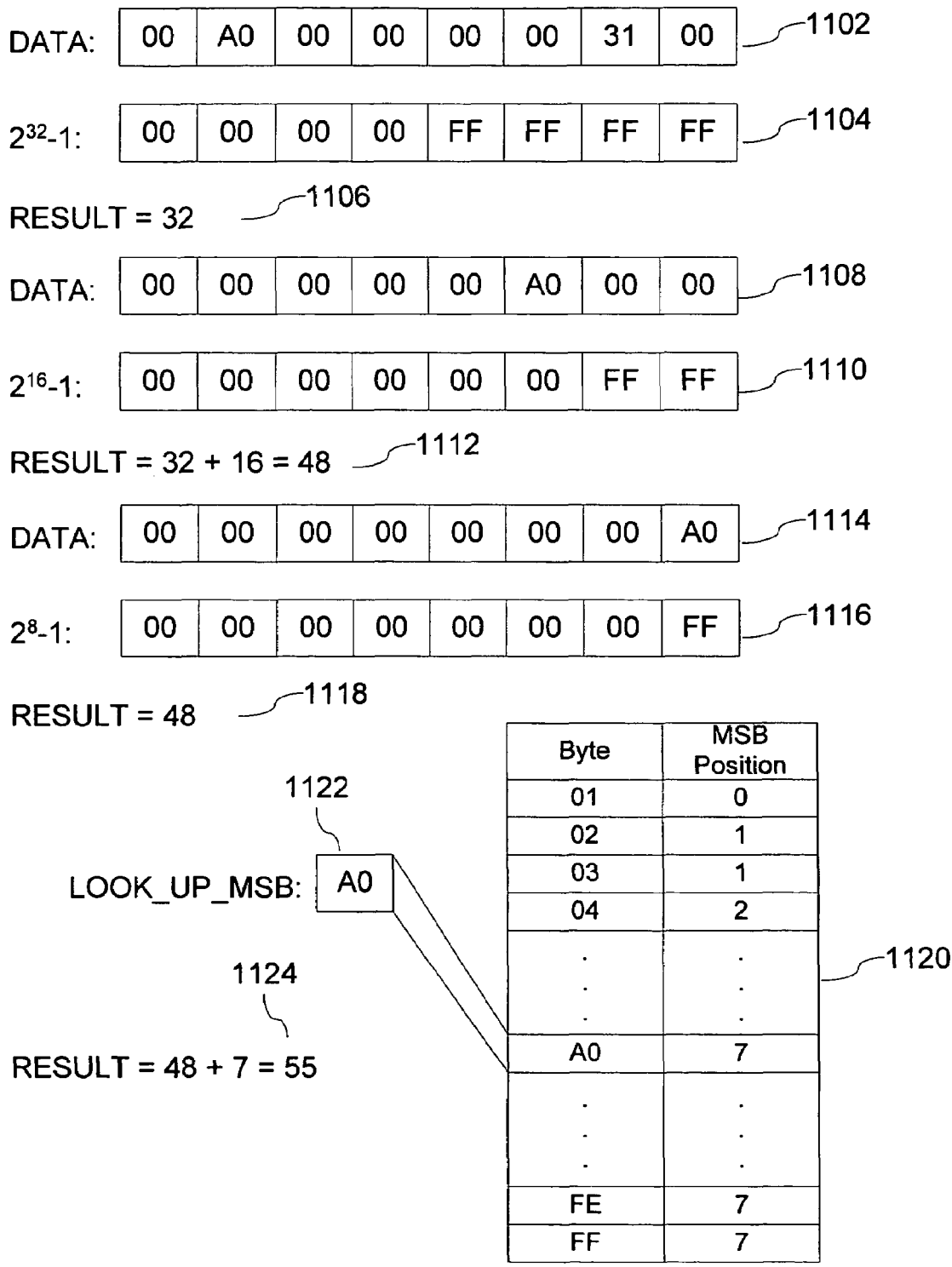
FIG. 11 is an illustration of an example implementation of a bit scan reverse operation using an integer instruction sequence implementation.

FIG. 11 is an illustration of an example implementation of a bit scan reverse operation using the integer instruction sequence implementation of FIG. 10. A 64-bit data value 1102 (DATA) is provided. The data value 1102 is compared to $2^{32}-1$, or h0xFFFFFFFF, 1104. DATA is greater than $2^{32}-1$, so a result value 1106 is incremented by 32, and DATA is right-shifted by 32. Because $2^{32}$ is greater than the desired number of values in the look-up table, 256, 32 is divided by two, and the shifted DATA value 1108 is compared to $2^{16}-1$, or h0xFFFF, 1110. Since h0xA00000 is greater than h0xFFFF, RESULT 1112 is incremented by 16, and DATA is right-shifted by 16. Because $2^{16}$ is greater than the desired number of values in the look-up table, 256, 16 is divided by two, and the shifted DATA value 1114 is compared to $2^8-1$, or h0xFF, 1116. The shifted DATA value 1114 is not greater than $2^8-1$, so the result value 1118 remains unchanged. $2^8$ is equal to the desired number of values in the look-up table, therefore the value of DATA value 1122 may be looked up in a 256 entry look-up table 1120. The most significant bit position is returned, and is added to the RESULT value. The value of RESULT 1124 is the bit position of the most significant bit in the original data value 1102.

Thus, methods for efficient execution and emulation of bit-scan forward and bit-scan reverse operations are described. These methods may be implemented in hardware, software, or firmware, among other implementations. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. A method for determining a position of a significant bit in a data value being processed in a microprocessor, the method comprising:
    negating the data value having a significant bit to provide a negated data value in a microprocessor operating on the data values, wherein negating the data value comprises using two's complement arithmetic to invert the data value and adding one to the inverted data value to provide the negated data value;
    performing an AND operation on the data value and the negated data value to provide a mask value in the microprocessor;
    subtracting one from the mask value to provide a decremented mask value in the microprocessor; and
    determining a quantity of bits in the decremented mask value that are set to one, wherein the quantity of bits is equal to the bit position of the least significant bit in the data value.

2. The method of claim 1, wherein the data value is a 64-bit number.

3. The method of claim 1, wherein determining the quantity of bits in the decremented mask value that are set to one comprises performing a population count operation on the mask value.

4. An article of manufacture comprising a machine-accessible medium having stored thereon instructions which, when executed by a machine, cause the machine to perform a method for determining a position of a significant bit in a data value being processed in a microprocessor of the machine, the instruction comprising:
    negate the data value having a significant bit to provide a negated data value in a microprocessor operating on the data value using two's complement arithmetic to invert the data value and adding one to the inverted data value to provide the negated data value;
    perform an AND operation on the data value and the negated data value to provide a mask value in the microprocessor;
    subtract one from the mask value to provide a decremented mask value in the microprocessor; and
    determine a quantity of bits in the decremented mask value that are set to one, wherein the quantity of bits is equal to the bit position of the least significant bit in the data value.

5. A system in which a position of a significant bit in a data value being processed in a microprocessor is determined, the system comprising:
    a bus;
    a processor coupled to the bus;
    a network interface coupled to the bus; and
    memory coupled to the processor, the memory adapted for storing instructions, data values, and mask values, which instructions, upon execution by the processor, cause the data value having a significant bit to be negated using two's complement arithmetic to invert the data value and add one to the inverted data value to provide a negated data value; an AND operation to be performed on the data value and the negated data value to provide a mask value; one to be subtracted from the mask value to provided a decremented mask value; and determining a quantity of bits in the decremented mask value that are set to one, wherein the quantity of bits is equal to the bit position of the least significant bit in the data value.

* * * * *